(12) United States Patent
Ogram

(10) Patent No.: US 11,220,186 B1
(45) Date of Patent: Jan. 11, 2022

(54) RANGE ENHANCING MECHANISM

(71) Applicant: Mark Ellery Ogram, Tucson, AZ (US)

(72) Inventor: Mark Ellery Ogram, Tucson, AZ (US)

( * ) Notice: Subject to any disclaimer, the term of this patent is extended or adjusted under 35 U.S.C. 154(b) by 0 days.

(21) Appl. No.: 17/300,357

(22) Filed: May 24, 2021

(51) Int. Cl.
  *B60L 50/62* (2019.01)
  *F02B 63/04* (2006.01)
  *B62D 63/06* (2006.01)

(52) U.S. Cl.
  CPC ............ B60L 50/62 (2019.02); F02B 63/047 (2013.01); F02B 63/048 (2013.01); *B62D 63/064* (2013.01)

(58) Field of Classification Search
  CPC .. B60L 50/62; B60L 53/10; B60L 9/00; F02B 63/047; F02B 63/048; B62D 63/064; B62D 63/062
  See application file for complete search history.

(56) References Cited

U.S. PATENT DOCUMENTS

| | | | | |
|---|---|---|---|---|
| 3,784,230 | A * | 1/1974 | Worrall, Jr. | B62D 63/064 280/415.1 |
| 4,457,546 | A * | 7/1984 | Wiant | B62D 63/062 280/47.12 |
| 6,390,215 | B1 * | 5/2002 | Kodama | B60L 50/62 180/65.22 |
| 6,559,558 | B2 | 5/2003 | Quesnel et al. | |
| 7,140,338 | B2 | 11/2006 | Janisch | |
| 8,562,011 | B1 | 10/2013 | Smith | |
| 10,099,524 | B1 | 10/2018 | Landry | |
| 10,189,442 | B1 | 1/2019 | Ford et al. | |
| 10,308,158 | B2 | 6/2019 | Quenzi et al. | |
| 10,696,112 | B2 | 6/2020 | Meingast et al. | |
| 10,836,225 | B2 | 11/2020 | Robinson et al. | |
| 10,967,750 | B2 | 4/2021 | Lee | |
| 10,983,166 | B2 | 4/2021 | Hellgren et al. | |
| 10,989,087 | B2 | 4/2021 | Yokoi | |
| 10,989,273 | B2 | 4/2021 | Obrist et al. | |
| 10,994,719 | B2 | 5/2021 | Obata | |
| 11,001,266 | B2 | 5/2021 | Kasahara | |
| 2010/0065344 | A1 * | 3/2010 | Collings, III | B60L 3/10 180/2.1 |

\* cited by examiner

*Primary Examiner* — Viet P Nguyen
(74) *Attorney, Agent, or Firm* — Mark Ogram

(57) ABSTRACT

An assist apparatus for an electric vehicle which is powered by rechargeable batteries. To assist in the range of the electric vehicle, a platform is secured or towed by the vehicle. On the platform is a hydrocarbon internal combustion engine/motor that generates electricity. The hydrocarbon engine/motor is activated, either manually, via a hand-held switch, or automatically by sensors in the electric vehicle, to charge the rechargeable batteries within the electric vehicle.

11 Claims, 3 Drawing Sheets

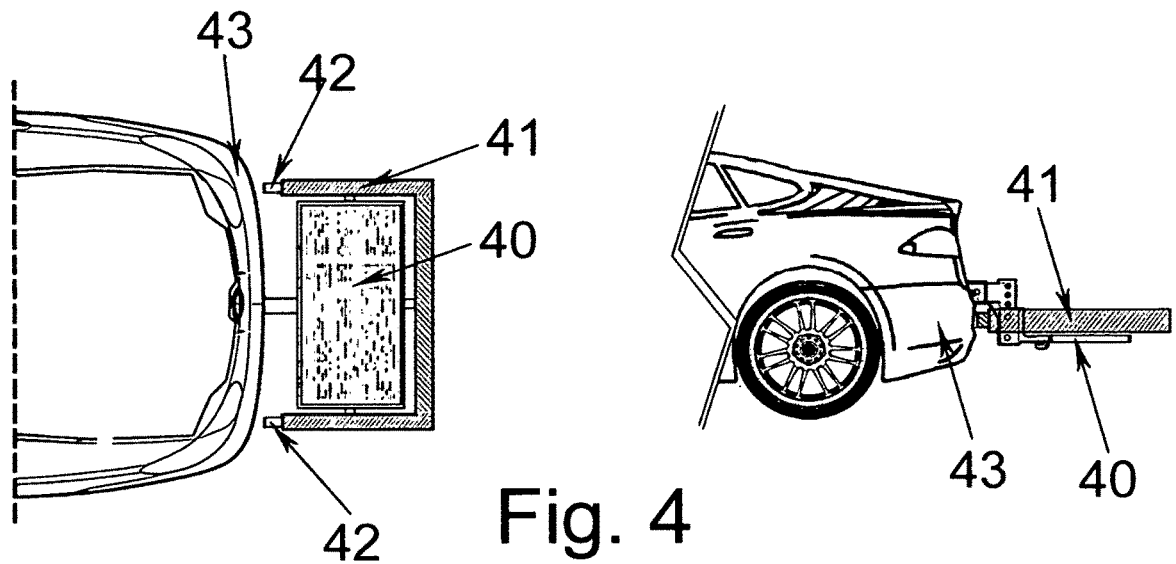
Fig. 4
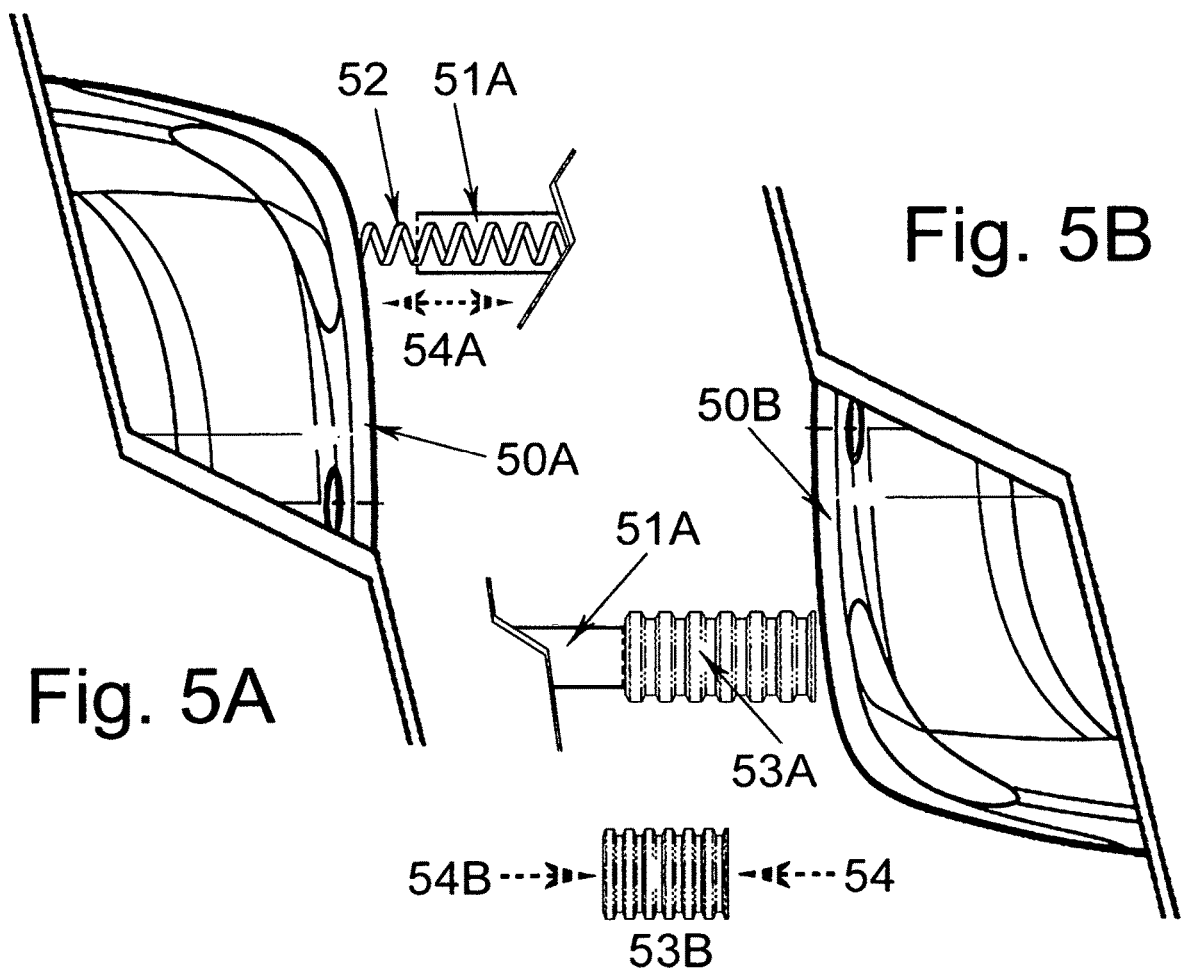
Fig. 5A
Fig. 5B

RANGE ENHANCING MECHANISM

BACKGROUND OF THE INVENTION

This invention relates generally to electrical vehicles and more particularly to a ready and fast mechanism to provide an on-the-go "recharge" to the vehicle.

Electric vehicles are touted as being environmentally friendly and as being more economical to operate. Estimates are that per-mile costs for fuel/energy, the electric vehicle is about half the cost of gasoline vehicles. With the cost of gasoline and diesel rising, the consumer is evaluating the electric vehicles in greater depth.

The biggest limiting factor for the potential consumer of an electric vehicle, is the limited range between recharging the battery. Often this range is only 300-400 miles which is more than suitable for suburban driving, but for interstate trips, the range limitation becomes problematic.

Further, if the battery becomes spent or exhausted, then the vehicle is left completely stranded. At the present time, the only solution is a tow to the next charging station.

It is clear there is a need to improve electric vehicles in order to make them acceptable to the general public.

SUMMARY OF THE INVENTION

The invention provides an assist apparatus for an electric vehicle which is powered by rechargeable batteries. To assist in the range of the electric vehicle, a platform is secured or towed by the vehicle. On the platform is a hydrocarbon motor that generates electricity. The hydrocarbon motor is activated, either manually via a handheld transmitter, via a switch connected to the hydrocarbon motor, or automatically by sensors in the electric vehicle to charge the rechargeable batteries within the electric vehicle.

In general terms, the invention involves an assist apparatus for an electric vehicle. The assist apparatus, when operating, provides a stream of electricity to the rechargeable battery on the electric vehicle. It is contemplated that the assist apparatus would not be used for traditional commutes but would be applicable for longer distances past the range of the electric vehicle's rechargeable battery, typically through a rental agency.

There are many versions of power systems used to recharge the battery. These include, but not limited to: U.S. Pat. No. 10,989,273, entitled "Power Unit" issued to Obrist et al. on Apr. 27, 2021; incorporated hereinto by reference.

The assist apparatus involves a platform which is securable to the vehicle (hanging on the bumper, attached to the towing slide, or via trailer) on which a traditional internal combustion engine is mounted. The internal combustion engine powers a generator and provides electricity to recharge the rechargeable battery traditionally found in an electric vehicle via an electrical cable/connection.

Those of ordinary skill in the art readily recognize a variety of electrical connections which may be employed in the context of charging the rechargeable battery, including, but not limited to: U.S. Pat. No. 0,967,750, entitled "System and Method for Charging Plug-in Hybrid Vehicle" issued to Lee et al. on Apr. 6, 2021; U.S. Pat. No. 10,989,087, entitled "Plug-In Hybrid Vehicle" issued to Yokoi on Apr. 27, 2021; all of which are incorporated hereinto by reference.

To operate the internal combustion engine, the preferred method is via a radio frequency handheld mechanism. The user, when they want to provide additional charge to the rechargeable battery, activates the internal combustion engine using the handheld transmitter; when done, the same radio frequency handheld transmitter is used to deactivate the internal combustion engine. In this way, the rechargeable battery is charged "on the go" without having to stop at a charging station.

Radio Frequency mechanisms are well known in the art for activating engines. These include: U.S. Pat. No. 6,559,558, entitled "Smart Car Starter" issued to Quesnel et al. on May 6, 2003; U.S. Pat. No. 7,140,338, entitled "Snowmobile Remote Ignition System" Issued to Janisch on Nov. 28, 2006; U.S. Pat. No. 10,189,442, entitled "Remote Vehicle Starter and Appliance Activation System" issued to Ford et al. on Jan. 29, 2019; all of which are incorporated hereinto by reference.

Further, should the electric vehicle become stranded due to a depleted rechargeable battery, a service provider is able to bring the assist apparatus to the site and recharge the battery, allowing the previously stranded driver to continue.

Besides the handheld mechanism described above, in another embodiment, the electric vehicle is equipped with a sensor on the rechargeable battery which activates, when needed, the assist apparatus.

A variety of mechanisms are used to monitor the rechargeable battery including, but not limited to: U.S. Pat. No. 10,983,166, entitled "Estimation of Battery Parameters" issued to Hellgren et al. on Apr. 20, 2021; U.S. Pat. No. 10,994,719, entitled "Method and Device for Controlling Hybrid Vehicle" issued to Obata on May 4, 2021; U.S. Pat. No. 11,001,266, entitled "Hybrid Vehicle Drive System" issued to Kasahara on May 11, 2021; all of which are incorporated hereinto by reference.

An important aspect of the present invention is the ability to protect the assist apparatus from damage from impact with either another moving vehicle (being rear ended) or by backing into a solid object (e.g. a wall). To provide this protection, a secondary bumper (preferably either metal or hardened rubber) issued. The preferred bumper is U-shaped and arranged around three sides of the platform.

In one embodiment of the invention, the secondary bumper contacts the primary bumper on the electric vehicle allowing the electric vehicle's bumper to provide more endurance to the secondary bumper.

In another embodiment, springs extend from the "legs" of the U-shaped secondary bumper to engage (either on impact or all the time) with the vehicle's bumper. The use of springs diminishes the possibility of doing serious damage on what would be considered a "minor" impact.

In yet another embodiment of the secondary bumper, collapsible cylinders are use in lieu of the springs. These collapsible cylinders are crushable on impact and are readily replaced later.

As noted earlier, the platform and the assist apparatus are securable to the bumper (hung from the bumper), are supported by a slide hitch receptacle, or on a small trailer that is pulled by the electric vehicle. All of these embodiments make the present invention ideal for commercialization through a rental organization such as an establishment that rents/leases cars and other items for over the road travel.

Those of ordinary skill in the art readily recognize a variety of trailer mechanisms, including, but not limited to those described in: U.S. Pat. No. 8,562,011, entitled "Utility Trailer" issued to Smith on Oct. 22, 2013; U.S. Pat. No. 10,308,158, entitled "Utility Trailer with Movable Bed" issued to Quenzi et al. on Jun. 4, 2019; all of which are incorporated hereinto by reference.

Slide attachments for towing trailers are also well known in the art and include: U.S. Pat. No. 10,099,524, entitled "Adjustable Trailer Hitch" issued to Laundry on Oct. 16, 2018; and U.S. Pat. No. 10,696,112, entitled "Lightweight Hitch Structure" issued to Meingast et al. on Jun. 3, 2020; U.S. Pat. No. 10,836,225, entitled "Detachable Receiver" issued to Robinson et al. on Nov. 17, 2020; all of which are incorporated hereinto by reference.

Ideally, the internal combustion engine uses a variety of carbon based fuels such as gasoline, diesel, propane, and natural gas.

The invention, together with various embodiments thereof, will be explained in detail by the accompanying drawings and the following descriptions thereof.

DRAWINGS IN BRIEF

FIG. 4 illustrates the preferred secondary bumper protection of the assist system in which the secondary bumper contacts the bumper on the vehicle.

FIGS. 5A and 5B illustrate two embodiments which are meant to reduce damage due to impact of the secondary bumper.

DRAWINGS IN DETAIL

Figure 1A:
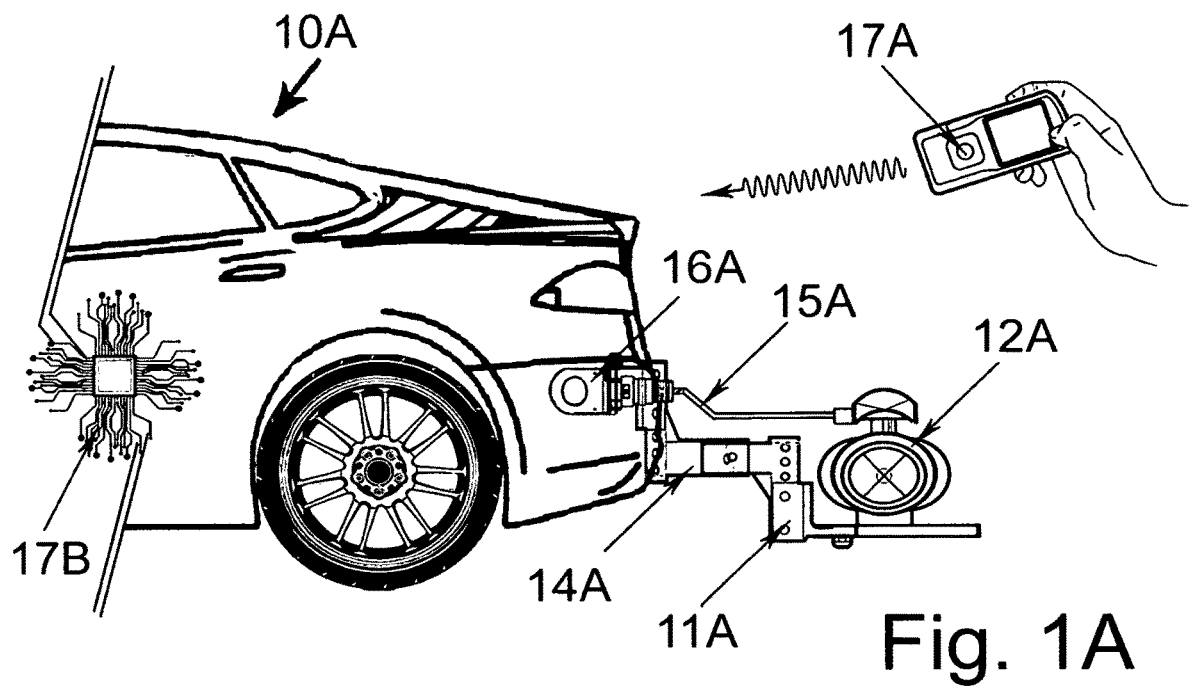
FIGS. 1A and 1B are side and top views of the preferred embodiment of the invention wherein the assist system is secured to the vehicle via a towing slide mount.
Figure 1B:
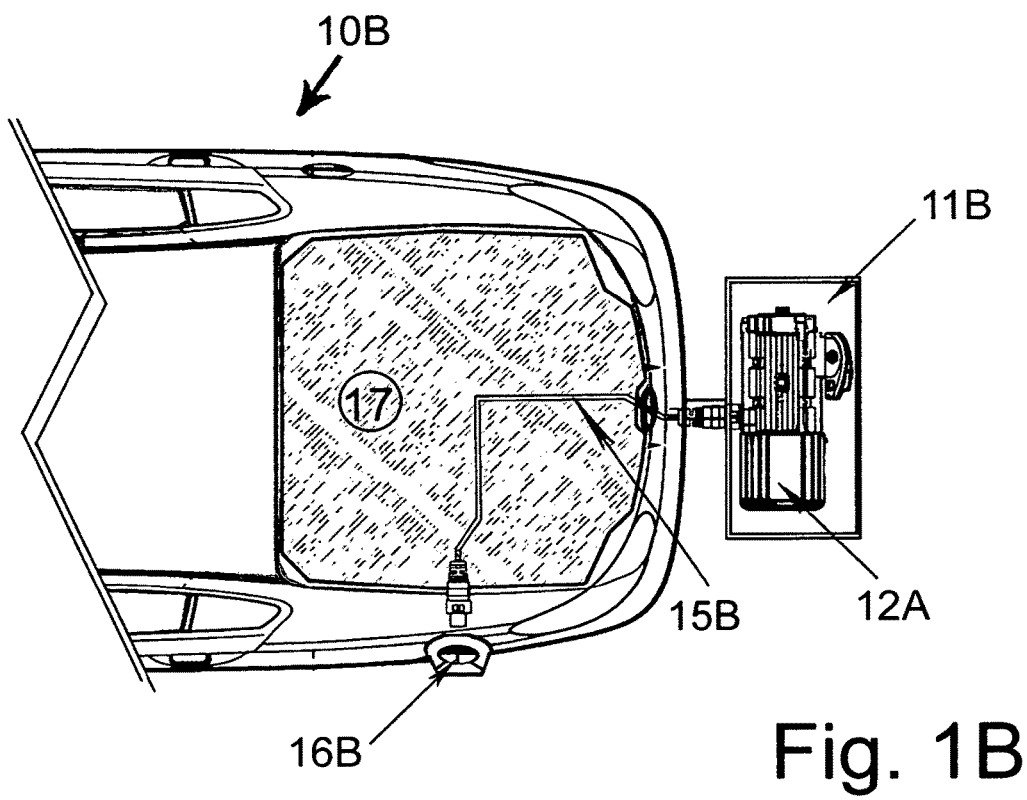

FIGS. 1A and 1B are side and top views of the preferred embodiment of the invention wherein the assist system is secured to the vehicle via a towing slide mount.

Referring to FIG. 1A, vehicle 10A has a slide mount 14A secured thereto. Platform 11A is secured into slide mount and presents a foundation for the mounting of motor/generator 12A. Electrical energy from motor/generator 12A is fed through electrical cable 15A which is connected to receptacle 16A of the electric vehicle 10A.

Receptacle 16A is the traditional connector used to recharge the rechargeable battery (not shown) within vehicle 10A. Unlike the illustration, in the preferred embodiment, receptacle 16A is positioned at the rear of vehicle 10A permitting easier connection with electrical cable 15A.

Activation and deactivation of motor/generator 12A is preferably done via radio transmitter 17A which is illustrated exterior to vehicle 10A, but, in the ideal embodiment, the operator of vehicle 10A activates from within vehicle 10A, to activate motor/generator 12A when the operator deems that the rechargeable battery needs to be boosted.

Alternatively, sensor 17B monitors the charge within the rechargeable battery and activates/deactivates motor/generator 12A when needed.

The embodiment, with the electrical connection within vehicle 10A, is illustrated in FIG. 1B. Again, platform 11B is secured to vehicle 10B on which is mounted motor/generator 12A. In this embodiment, electrical cable 15B is passed into trunk 17 to connect with receptacle 16B. Receptacle 16B is optionally created during manufacture of the electric vehicle 10B or is installed as an after-market item.

The embodiment of FIG. 1B provides more protection for the connection between electrical cable 15B and receptacle 16B.

Mounting, and dismounting the assist apparatus to the vehicle is ideally done as a two-step process. In mounting, first the platform is secured to the vehicle and then the motor/generator is secured to the platform. Dismounting is done in the reverse. This two-step process is easier due the component's weight.

Figure 2:
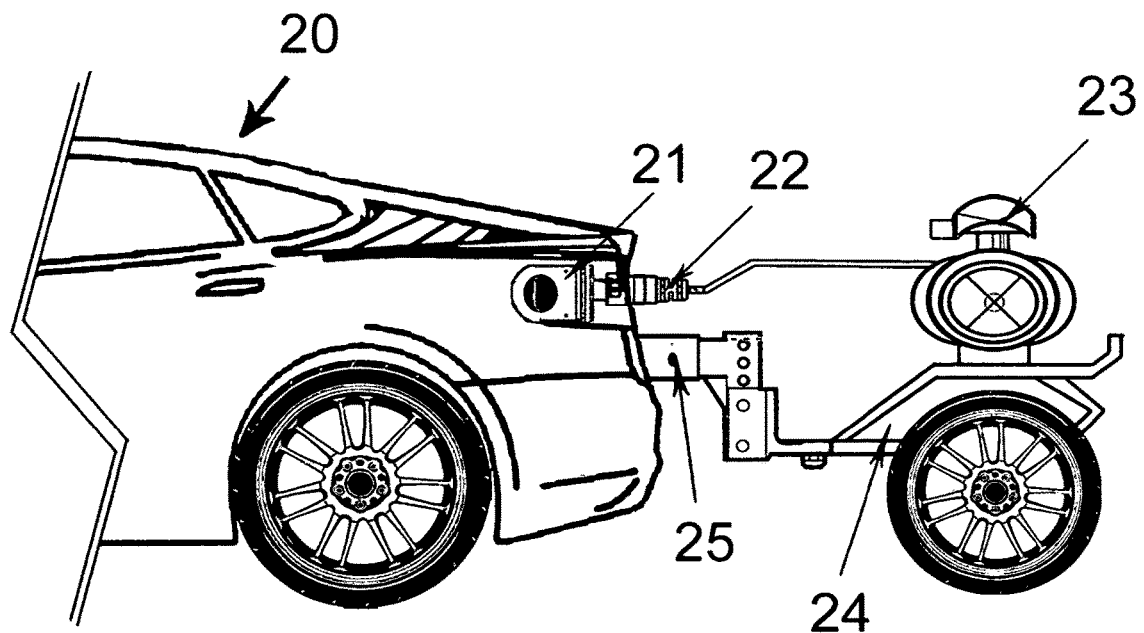
FIG. 2 is side view in which the assist system is being towed as a trailer.

FIG. 2 is side view in which the assist system is being towed as a trailer.

In this embodiment of the invention, vehicle 20 is equipped with a tow bracket 25 which is secured to trailer 24. Motor/generator 23 is carried by trailer 24. Power from the motor/generator 23 is communicated to vehicle 20 and its electrical receptacle 21 via electrical cable 22.

Figure 3:
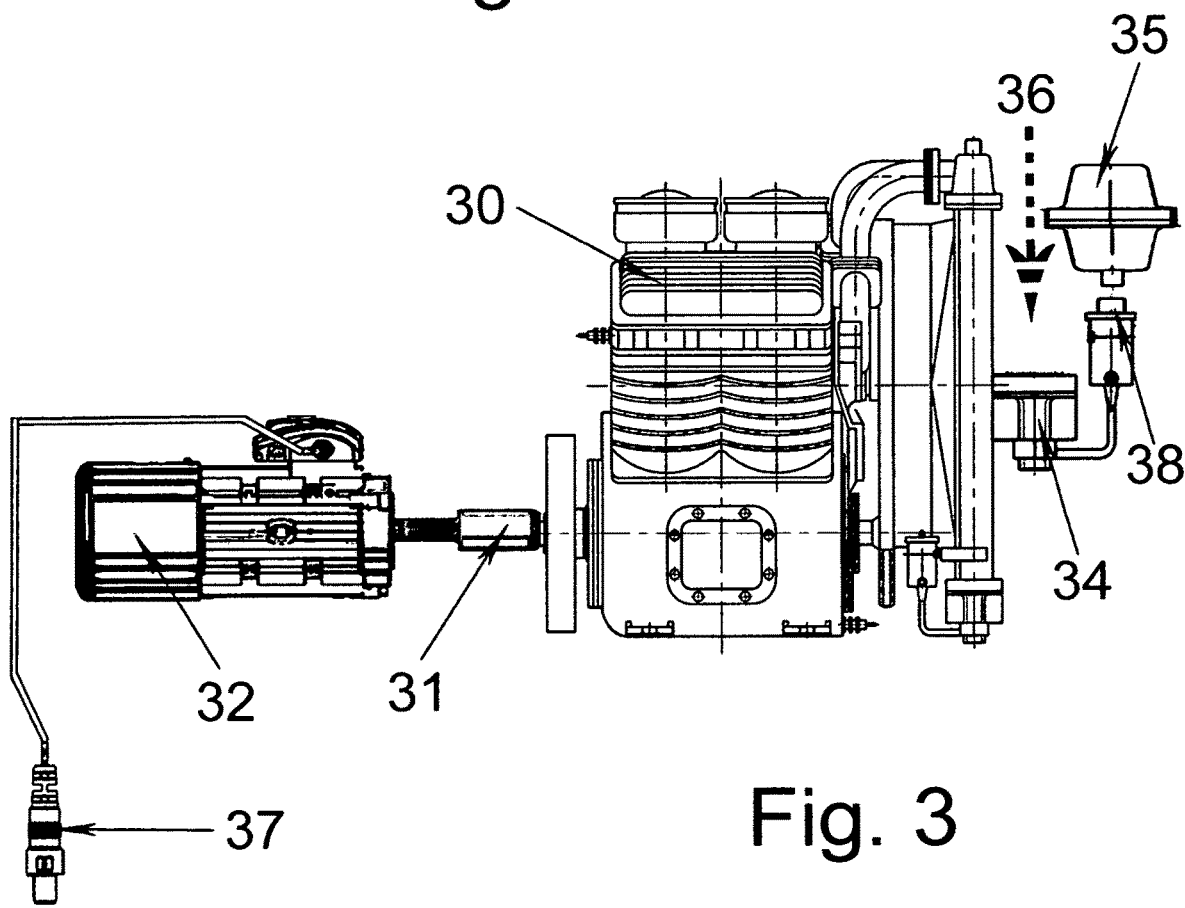
FIG. 3 illustrates the internal combustion engine of the present invention.

FIG. 3 illustrates the internal combustion engine of the present invention.

In the preferred embodiment, motor 30 is a typical internal combustion engine with its exhaust being muffled for noise concerns. Drive shaft 31 from motor 30 drives generator 32 and the electricity therefrom is communicated to the vehicle (not shown) via electrical cable 37.

Motor 30 is powered by hydrocarbon s such as gasoline and diesel in liquid form. Cannister 35 is used to contain hydrocarbons in the gaseous state such as propane and natural gas. Cannister 35 is securable to inlet 38 as indicated by arrows 36.

FIG. 4 illustrates the preferred embodiment of the U-shaped secondary bumper protection of the assist system in which the secondary bumper contacts the bumper on the vehicle.

Bumper 40 is generally U shaped with end of the legs 42 proximate to the vehicle's bumper 43. In this embodiment, legs 42 do not contact bumper 43 except during impact. In other embodiments, legs 42 are held firmly against bumper 43.

FIGS. 5A and 5B illustrate two embodiments which are meant to reduce damage due to impact of the secondary bumper.

Referring to FIG. 5A, a top view and side view of the preferred bumper used to protect the motor/generator, leg 51A (only one shown in this illustration) are hollow and contain a spring 52 which extends from leg 51A so that on impact with the bumper, leg 51A is forced (arrow 54A) toward the electric vehicle's bumper 50A, allowing spring 52 to absorb the impacts force to minimize damage to bumper protecting the motor generator.

In FIG. 5B, a collapsible cannister 53A is secured to leg 51A. When the leg 51A and cannister 53A, are pressed against the vehicle's bumper 50B, collapsible cannister "crumbles" 53B as shown by arrow 54B. This crumbling absorbs the impact force to minimize damage.

It is clear that the present invention provides for an improvement for electric vehicles in order to make these vehicles more acceptable to the general public.

What is claimed is:

1. An assist apparatus for an electric vehicle being powered solely by rechargeable batteries, said assist apparatus comprising:
   a) a platform mountable to the electric vehicle and supported by the electric vehicle and exterior to the electric vehicle and wherein the platform is mounted to a primary bumper of the electric vehicle;
   b) a charging station secured to the platform, said charging station powered by a hydrocarbon source and selectively generating electricity; and,
   c) an electrical connection communicating electricity from the charging station to the rechargeable battery within the electric vehicle; and,
   d) a generally U-shaped secondary bumper arranged to protect the platform from impact, said secondary bumper contacting the primary bumper at a first and a second location and includes a first and a second spring extending from the secondary bumper to engage the first and second locations of the primary bumper.

2. The assist apparatus according to claim 1, further including a handheld ignition transmitter communicating with the charging station via radio waves for selective activation/deactivation of the charging station.

3. The assist apparatus according to claim 1, wherein the electric vehicle includes a battery monitor adapted to gauge a status of the rechargeable battery and wherein the battery monitor selectively activates the charging station based upon the status of the rechargeable battery.

4. The assist apparatus according to claim 1, further including a first and a second collapsible cylinder extending from the secondary bumper to engage the first and second locations of the primary bumper.

5. The assist apparatus according to claim 1, wherein the platform is securable to the electric vehicle via a towing slide secured to the electric vehicle.

6. The assist apparatus according to claim 1, wherein the hydrocarbon source is chosen from a group consisting of gasoline, diesel, propane, and natural gas.

7. A vehicle comprising:
a) an electric vehicle;
b) a platform mountable to an exterior portion of the electric vehicle, wherein the platform is mounted to a primary bumper of the electric vehicle, said platform having a generally U shaped secondary bumper arranged to protect the platform from impact and contacts the primary bumper at a first and a second location and includes a first and a second spring extending from the secondary bumper to engage the first and second locations of the primary bumper;
c) a charging station secured to the platform, said charging station powered by a hydrocarbon source and selectively generating electricity; and,
d) an electrical connection communicating electricity from the charging station to a rechargeable battery within the electric vehicle.

8. The vehicle according to claim 7, further including a handheld ignition transmitter communicating with the charging station via radio waves for selective activation/deactivation of the charging station.

9. The assist apparatus according to claim 8, wherein the platform is securable to a bumper of the electric vehicle.

10. A system comprising:
a) an electric vehicle being powered solely by a rechargeable battery and having a primary bumper;
b) a platform mountable to an exterior portion of the electric vehicle, said platform including a generally U-shaped secondary bumper arranged to protect the platform from impact, said secondary bumper contacts the primary bumper at a first and a second location and includes a first and a second spring extending from the secondary bumper to engage the first and second locations of the primary bumper;
c) a charging station secured to the platform, said charging station powered by a hydrocarbon source and selectively generating electricity;
d) an electrical connection communicating electricity from the charging station to the rechargeable battery within the electric vehicle; and,
e) a handheld ignition transmitter communicating with the charging station via radio waves for selective activation/deactivation of the charging station.

11. The assist apparatus according to claim 10, wherein the platform is securable to a bumper of the electric vehicle.

* * * * *